United States Patent
Chow et al.

(10) Patent No.: US 9,481,216 B2
(45) Date of Patent: Nov. 1, 2016

(54) TIRE PRESSURE SENSOR MODULE

(71) Applicants: SYSGRATION LTD., Taipei (TW); CUB Elecparts Inc., Changhua County (TW)

(72) Inventors: Tsaichiang Chow, Taipei (TW); Shihchin Cho, Taipei (TW); Shihyao Lin, Taipei (TW); Tzu-Wen Ko, Changhua County (TW); Chi-Hung Chen, Changhua County (TW)

(73) Assignee: SYSGRATION LTD., Taipei (TW)

( * ) Notice: Subject to any disclaimer, the term of this patent is extended or adjusted under 35 U.S.C. 154(b) by 0 days.

(21) Appl. No.: 14/676,820

(22) Filed: Apr. 2, 2015

(65) Prior Publication Data
US 2015/0283868 A1    Oct. 8, 2015

(30) Foreign Application Priority Data

Apr. 8, 2014  (TW) .............................. 103206033 U

(51) Int. Cl.
*B60C 23/00* (2006.01)
*B60C 23/04* (2006.01)
*B60C 23/20* (2006.01)

(52) U.S. Cl.
CPC ......... *B60C 23/0462* (2013.01); *B60C 23/041* (2013.01); *B60C 23/0438* (2013.01); *B60C 23/0479* (2013.01); *B60C 23/0486* (2013.01); *B60C 23/0494* (2013.01); *B60C 23/0496* (2013.01); *B60C 23/20* (2013.01)

(58) Field of Classification Search
CPC ..................... B60C 23/0438; B60C 23/0494; B60C 23/041; B60C 23/0462; B60C 23/0479; B60C 23/00; B60C 23/02; B60C 23/04; B60C 23/20; G08C 17/02
USPC ....... 340/442, 444, 445, 447; 73/146, 146.2; 116/34 R; 701/29, 32.7
See application file for complete search history.

(56) References Cited

U.S. PATENT DOCUMENTS

| | | | |
|---|---|---|---|
| 6,445,287 B1 * | 9/2002 | Schofield .............. | B60R 1/1207 340/442 |
| 7,541,919 B1 * | 6/2009 | Huang ................ | B60C 23/0408 340/445 |
| 8,935,956 B2 * | 1/2015 | Yu ....................... | B60C 23/0452 340/442 |
| 2005/0274166 A1 * | 12/2005 | Wu ......................... | G01L 17/00 73/1.63 |
| 2005/0274442 A1 * | 12/2005 | Huang ................ | B60C 23/0408 152/415 |
| 2006/0087419 A1 * | 4/2006 | Peng ................... | B60C 23/0408 340/445 |
| 2008/0252435 A1 * | 10/2008 | Chien .................. | B60C 23/009 340/438 |
| 2009/0315697 A1 * | 12/2009 | Huang ................ | B60C 23/0408 340/447 |
| 2012/0204634 A1 * | 8/2012 | Yu ....................... | B60C 23/0494 73/146.8 |
| 2013/0009762 A1 * | 1/2013 | Yu ....................... | B60C 23/0494 340/442 |
| 2014/0172342 A1 * | 6/2014 | Yu ....................... | B60C 23/0462 702/104 |

* cited by examiner

*Primary Examiner* — Hung T Nguyen
(74) *Attorney, Agent, or Firm* — Leong C. Lei

(57) ABSTRACT

The tire pressure sensor module contains a casing, a nozzle, a sleeve element, a fastening element, and a two-way tire information transmission and sensory system inside the casing. The casing has a trough and an air opening. The nozzle contains a nozzle mouth and a nozzle base. The nozzle base is joined to the casing, and the mouth is threaded through the sleeve element. The nozzle and the sleeve element are secured to the casing by the fastening element through the trough. The two-way tire information transmission and sensory system contains a battery, a micro-controller circuit, a low-power-consumption Bluetooth wireless transceiver circuit, a boosting/regulating circuit, a pressure sensor, an operation amplifier, a gravity sensor, a temperature sensor, and an antenna.

3 Claims, 6 Drawing Sheets

TIRE PRESSURE SENSOR MODULE

BACKGROUND OF THE INVENTION (a) Technical Field of the Invention

The present invention is generally related to tire pressure monitoring systems (TPMS), and more particular to a wireless tire pressure sensor module for TPMS.

(b) Description of the Prior Art

A tire pressure sensor is usually integrated with the nozzle of a tire. Therefore, to install the tire pressure sensor on an ordinary tire, the tire's original nozzle is replaced and discarded. On one hand, this is a waste. On the other hand, a nozzle integrated with the tire pressure sensor also is more costly than an ordinary nozzle.

SUMMARY OF THE INVENTION

Therefore, the present invention provides a novel tire pressure sensor module with reduced power consumption and capable of working with handheld mobile device through Bluetooth.

A major objective of the present invention is to provide a tire pressure sensor module using Bluetooth signal, instead of the conventional 434 MHz or 315 MHz radio signal.

A second objective of the present invention is to provide a tire pressure sensor module capable of alerting a vehicle owner when the vehicle undergoes abnormal displacement or vibration, thereby providing anti-theft function.

Another objective of the present invention is to provide a tire pressure sensor module capable of conveniently locating the vehicle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
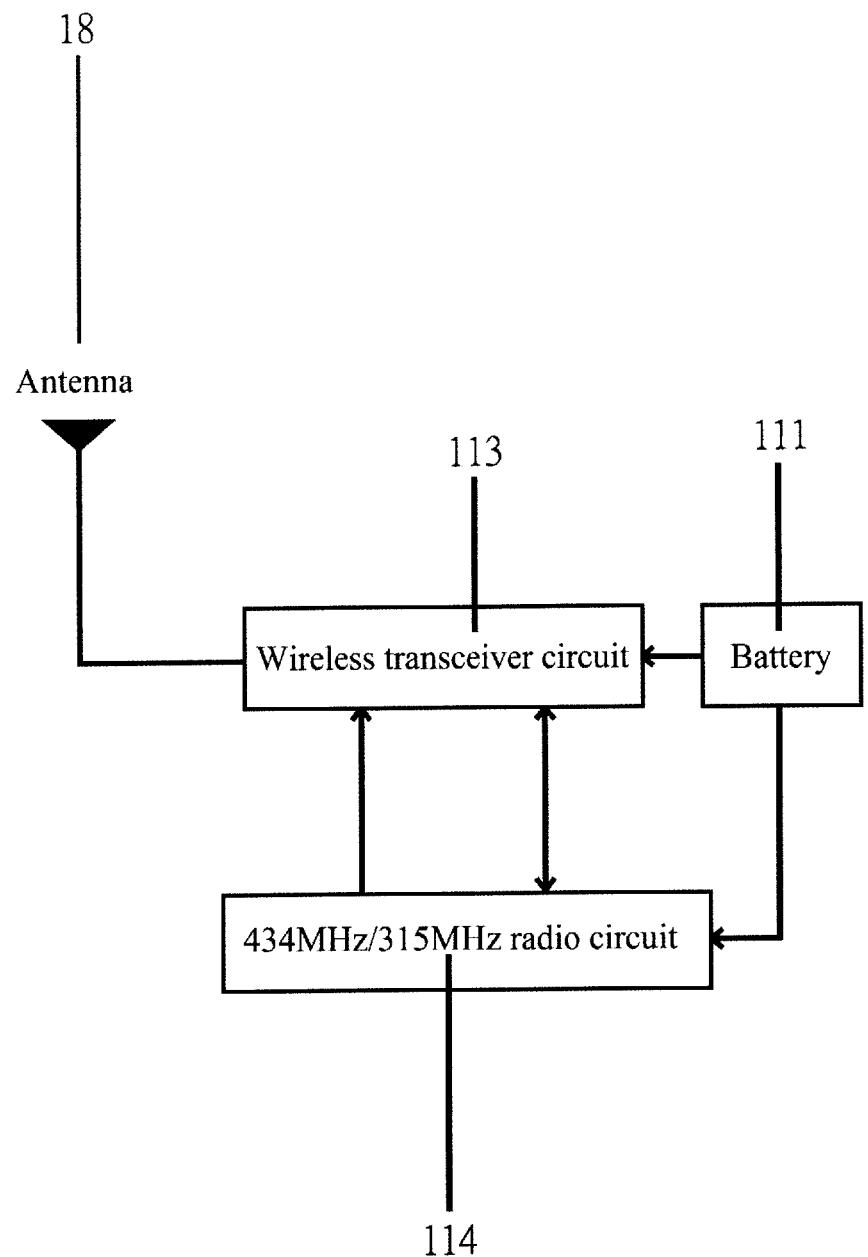
FIG. 1 is a functional block diagram showing a conventional tire pressure sensor module.
Figure 2:
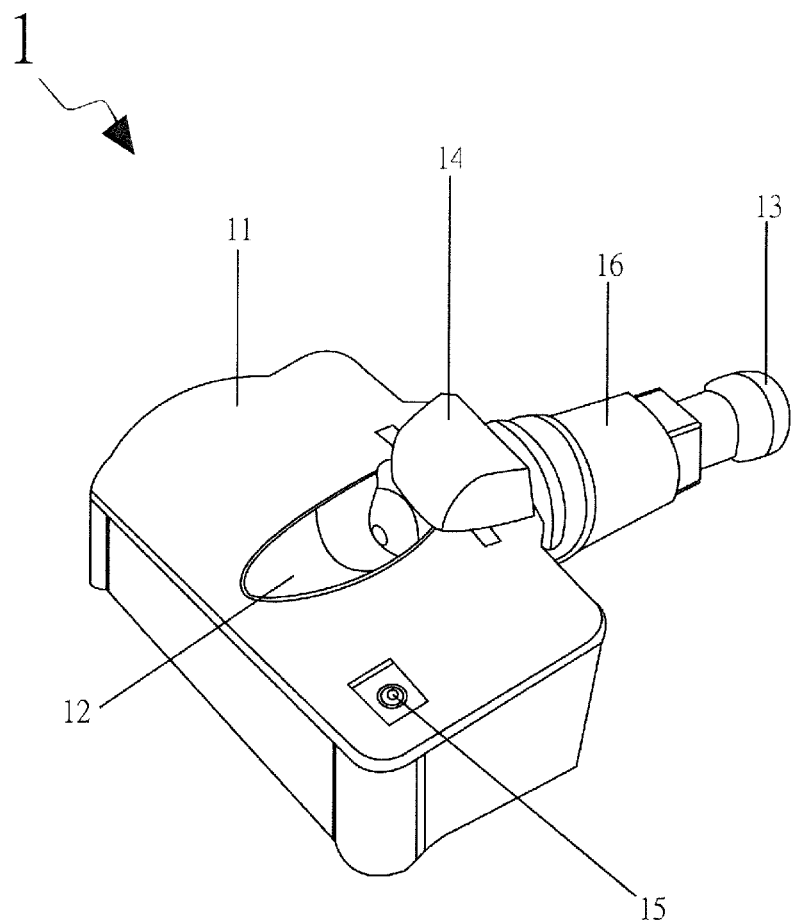
FIG. 2 is a perspective diagram showing the appearance of a tire pressure sensor according to an embodiment of the present invention.
Figure 6:
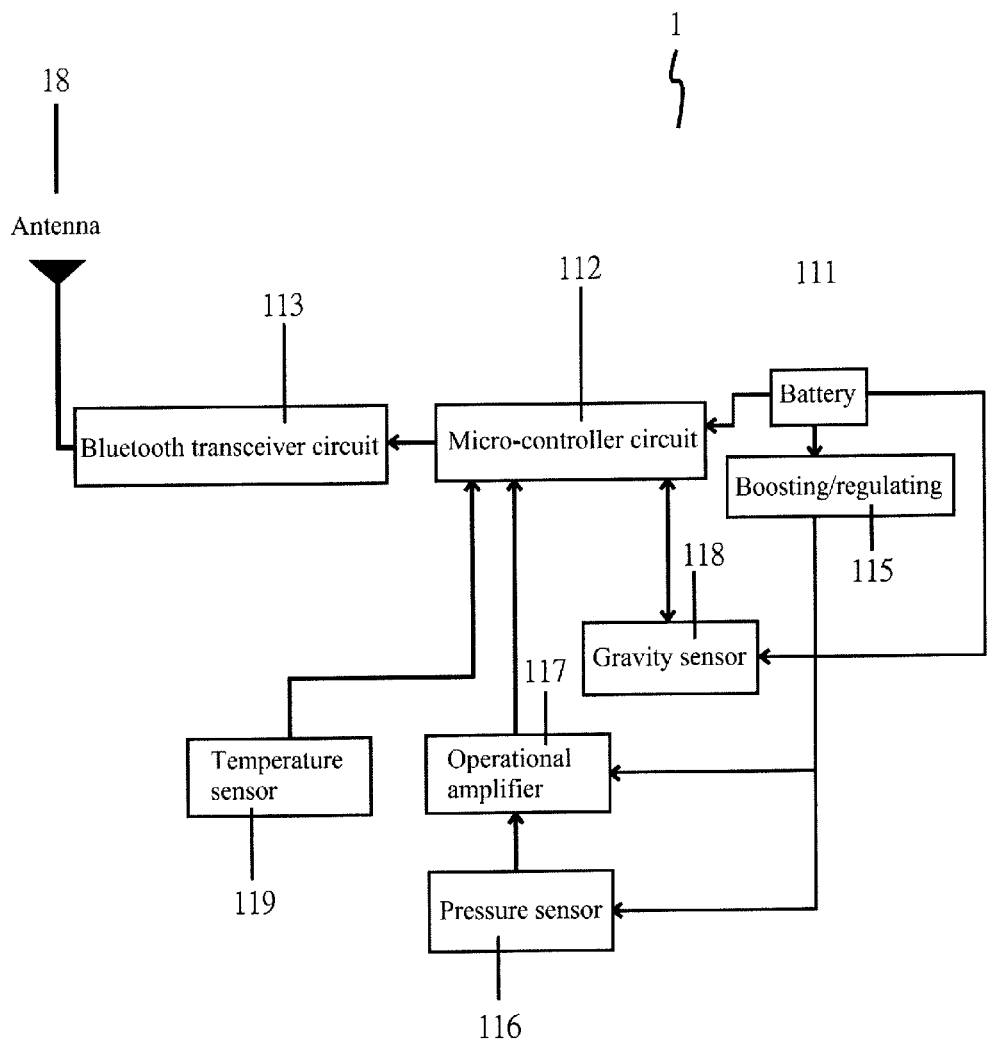
FIG. 6 is a functional block diagram showing the tire pressure sensor module of FIG. 2.

FIG. 2 is a perspective diagram showing the appearance of a tire pressure sensor according to an embodiment of the present invention. As illustrated, the tire pressure sensor module 1 contains a casing 11, a nozzle, a sleeve element 16, and a fastening element 17. The nozzle contains a mouth 13 and a base 14. The casing 11 has a trough 12 and an air opening 15. The nozzle has the base 14 joined to the casing 11, and the mouth 13 threaded through the sleeve element 16. The nozzle and the sleeve element 16 are secured to the casing 11 by the fastening element 17 through the trough 12. FIG. 6 is a functional block diagram showing the tire pressure sensor module 1 of FIG. 2. As illustrated, inside the casing 11, there is a two-way tire information transmission and sensory system which contains a battery 111, a microcontroller circuit 112, a low-power-consumption wireless transceiver circuit 113, a boosting/regulating circuit 115, a pressure sensor 116, an operational amplifier 117, a gravity sensor 118, a temperature sensor 119, and an antenna 18. FIG. 1 is a functional block diagram showing a conventional tire pressure sensor module. Comparing FIGS. 1 and 6, one of the major differences between the conventional tire pressure sensor module and the present invention is that the conventional wireless transceiver circuit 114 is one using 434 MHz or 315 MHz radio signals, and is replaced by the low-power-consumption wireless transceiver circuit 113. In one embodiment, the low-power-consumption wireless transceiver circuit 113 is a Bluetooth transceiver circuit.

Figure 3:
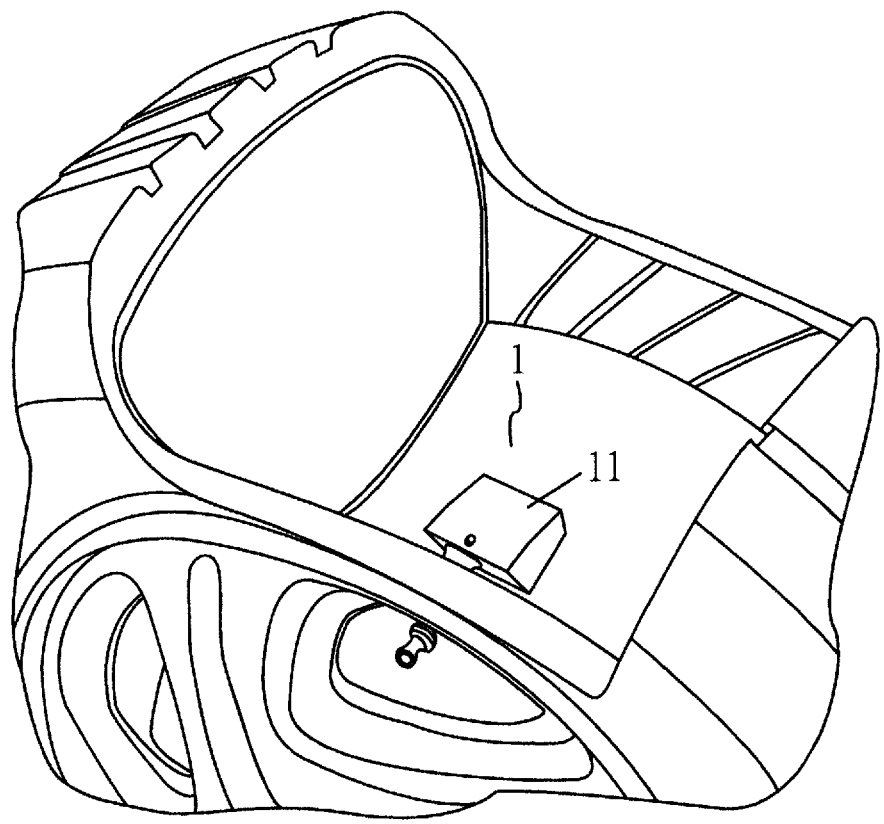
FIG. 3 is a perspective schematic diagram showing the installation of the tire pressure sensor module of FIG. 2 in a tire.

FIG. 3 is a perspective schematic diagram showing the installation of a tire pressure sensor module 1 of the present embodiment in a tire. As illustrated, the casing 11 of the tire pressure sensor module 1 is housed and concealed inside the tire whereas the nozzle mouth 13 of the tire pressure sensor module 1 is exposed outside the tire and a rim of the tire.

Figure 4:
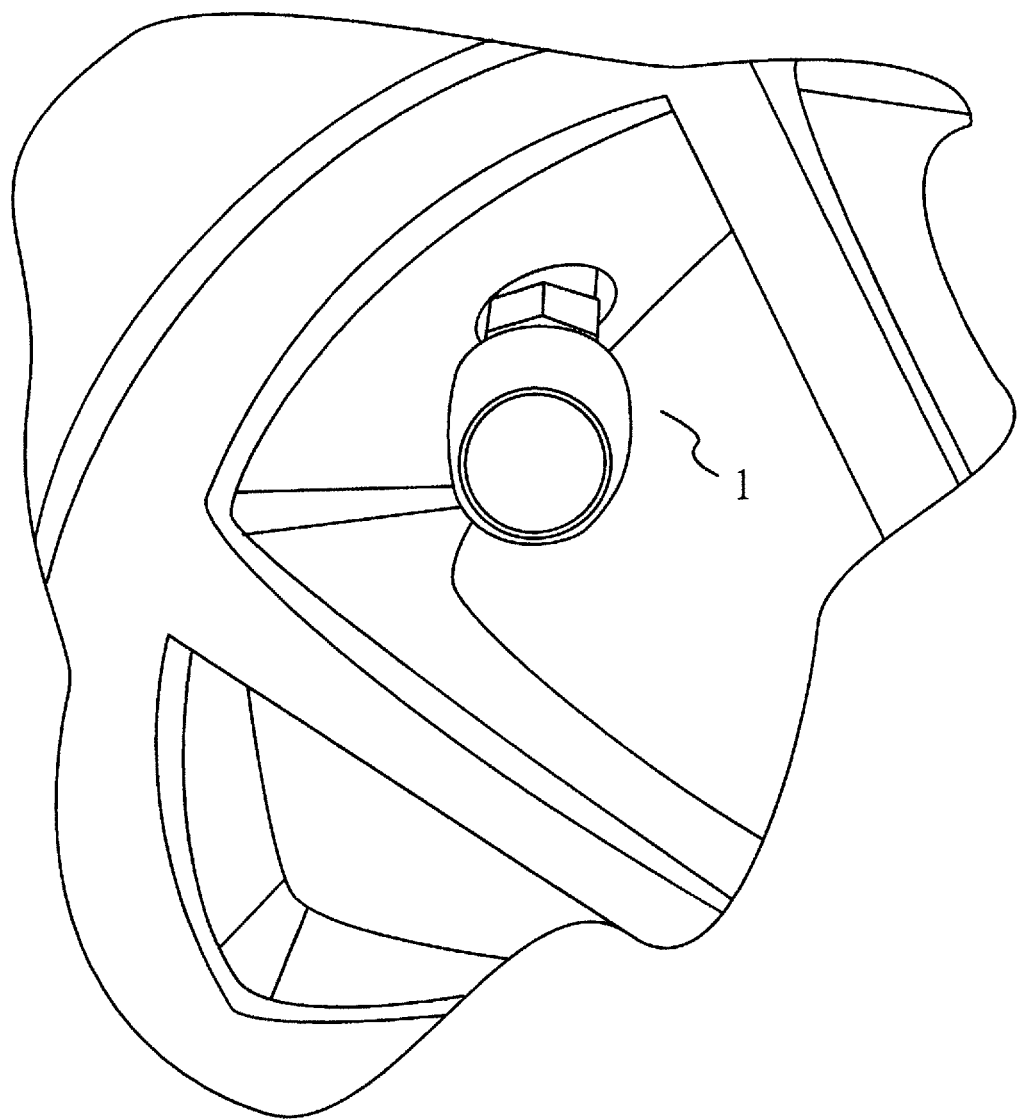
FIG. 4 is a perspective diagram showing the installation of a tire pressure sensor module of FIG. 2 in a tire from another perspective.

FIG. 4 is a perspective diagram showing the installation of the tire pressure sensor module 1 of the present embodiment in a tire from another perspective. As illustrate, the tire pressure sensor module 1 is fixed onto the nozzle hole on the tire rim with the nozzle mouth 13 exposed.

Figure 5:
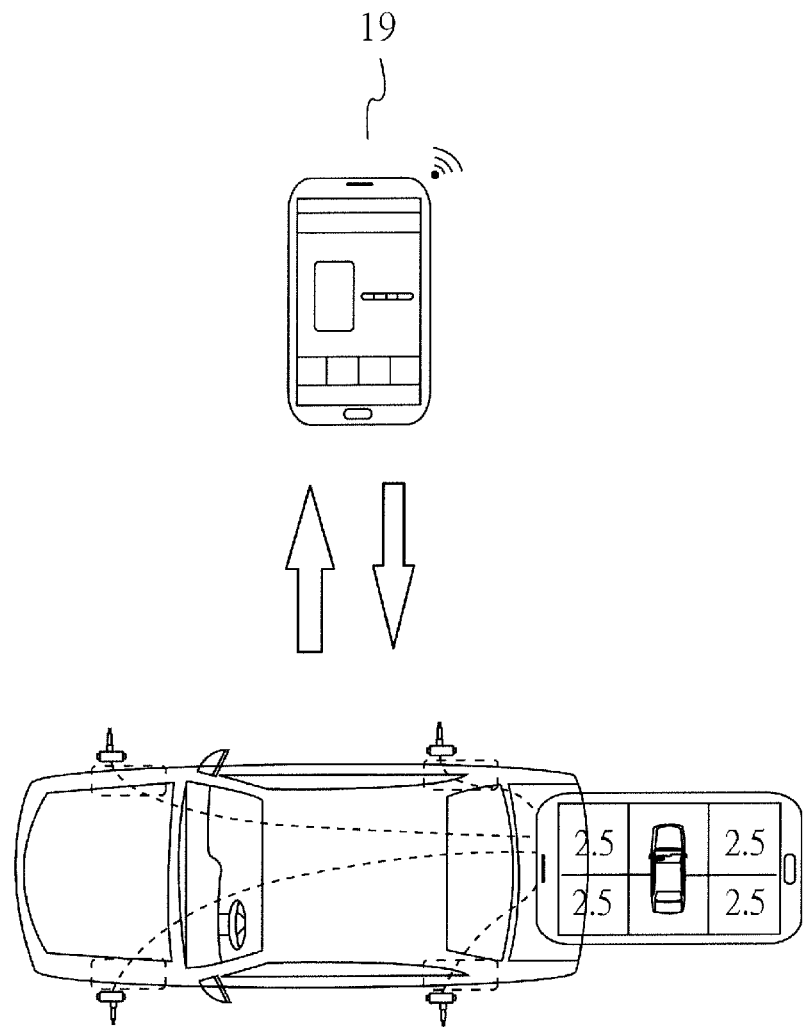
FIG. 5 is a schematic diagram showing an operation scenario of four tire pressure sensor modules installed on a vehicle's four wheels.

FIG. 5 is a schematic diagram showing an operation scenario of four tire pressure sensor modules 1 installed on a vehicle's four wheels. As illustrated, each tire pressure sensor modules 1 is capable of collecting a remaining electricity level in the battery 111, a tire pressure value, and a tire temperature value, and transmitting these pieces of information to a handheld mobile device 19 configured with a wireless transceiver. In one embodiment, the wireless transceiver of the handheld mobile device 19 is a Bluetooth transceiver.

The handheld mobile device 19 is one of a smart phone, a tablet computer, or other mobile device with computing capability running an operating system such as iOS, Android, or Windows. Please note that the gravity sensor 118 can provide anti-theft function. When the vehicle is parked and the vehicle undergoes abnormal displacement and vibration, the gravity sensor 118 can pick up this abnormal signal and the tire pressure sensor module 1 can trigger, within an effective coverage, the handheld mobile device 19 to ring or to vibrate so as to alert the vehicle owner.

In addition, by detecting the Bluetooth signal strength from the tire pressure sensor module 1, the handheld mobile device 19 can present corresponding graphic images or audio clips to the vehicle owner. The vehicle owner then can conveniently locate the vehicle's parking location within an effective coverage. Once the vehicle is parked, the handheld mobile device 19 can be configured to store coordinate information using GPS or Global Navigation Satellite System (GLONASS). As such, even though the handheld mobile device 19 and the tire pressure sensor module 1 are outside the effective coverage, the vehicle owner is still able to locate the vehicle.

The handheld mobile device 19 is equipped with a reception module capable of receiving GPS or GLONASS data, or the handheld mobile device 19 is equipped with a communication module linking with another device capable of receiving GPS or GLONASS data. After the handheld mobile device 19 is linked with the GPS or GLONASS device and when there is flat tire event or the tire pressure is not normal, an application such as an APP, APK, or a service software in the handheld mobile device 19 can transmit the coordinate information to support units for assistance.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A tire pressure sensor module, comprising a casing, a nozzle, a sleeve element, a fastening element, a handheld mobile device, and a two-way tire information transmission and a sensory system inside the casing; wherein the casing has a trough and an air opening;
  the nozzle comprises a nozzle mouth and a nozzle base;
  the nozzle base is joined to the casing, and the mouth is threaded through the sleeve element;
  the nozzle and the sleeve element are secured to the casing by the fastening element through the trough;
  the two-way tire information transmission and the sensory system comprises a battery, a Bluetooth Low Energy (BLE) wireless transceiver circuit, a pressure sensor, a gravity sensor, a temperature sensor, and an antenna;
  the handheld mobile device comprises a service software, a Bluetooth transceiver, and a reception module capable of receiving GPS or GLONASS data;
  the two-way tire information transmission and the sensory system collects and transmits a remaining electricity level in the battery, a tire pressure value, and a tire temperature value to the handheld mobile device;
  the two-way tire information transmission and the sensory system collects and transmits a displacement and vibration from the gravity sensor to the handheld mobile device; and
  when there is an abnormal condition, the tire pressure sensor module triggers, within an effective coverage, the handheld mobile device, and the service software in the handheld mobile device transmits a current GPS or GLONASS data for assistance.

2. The tire pressure sensor module according to claim 1, wherein the two-way tire information transmission and sensory system collects a remaining electricity level in the battery, a tire pressure value, and a tire temperature value.

3. The tire pressure sensor module according to claim 1, wherein the handheld mobile device is a mobile device with computing capability running one of the operating systems iOS, Android, and Windows.

* * * * *